United States Patent
Follen et al.

(10) Patent No.: US 12,371,019 B2
(45) Date of Patent: Jul. 29, 2025

(54) DYNAMIC POWERTRAIN CONTROL IN COORDINATION WITH ADAPTIVE CRUISE CONTROL

(71) Applicant: Cummins Inc., Columbus, IN (US)

(72) Inventors: Kenneth M. Follen, Greenwood, IN (US); Rohinish Gupta, Columbus, IN (US); Jonathan A. Dickson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 233 days.

(21) Appl. No.: 18/047,320

(22) Filed: Oct. 18, 2022

(65) Prior Publication Data

US 2024/0123990 A1 Apr. 18, 2024

(51) Int. Cl.
*B60W 30/17* (2020.01)

(52) U.S. Cl.
CPC .................. *B60W 30/17* (2013.01)

(58) Field of Classification Search
CPC ..................................... B60W 30/17
See application file for complete search history.

(56) References Cited

U.S. PATENT DOCUMENTS

| | | | |
|---|---|---|---|
| 6,374,173 B1 | 4/2002 | Ehlbeck | |
| 8,229,644 B2 | 7/2012 | Boecker et al. | |
| 8,359,149 B2 | 1/2013 | Shin | |
| 9,020,726 B2 | 4/2015 | Boeckenhoff et al. | |
| 9,376,109 B2 | 6/2016 | Johansson et al. | |
| 9,827,986 B2 | 11/2017 | Pilutti et al. | |
| 10,843,689 B2 | 11/2020 | Jiang et al. | |
| 11,034,352 B2 | 6/2021 | Shah et al. | |
| 11,046,309 B2 | 6/2021 | Chunodkar et al. | |
| 2009/0299598 A1* | 12/2009 | Boecker | B60W 30/16 701/96 |
| 2015/0081189 A1* | 3/2015 | Fairgrieve | B60W 30/16 701/96 |
| 2016/0039418 A1 | 2/2016 | Wall et al. | |
| 2016/0176402 A1* | 6/2016 | Andersson | B60W 30/16 701/96 |
| 2018/0043793 A1* | 2/2018 | Herb | B60W 10/08 |

(Continued)

FOREIGN PATENT DOCUMENTS

| | | |
|---|---|---|
| DE | 10349434 A1 | 6/2004 |
| WO | 2008056262 A2 | 5/2008 |

*Primary Examiner* — Hunter B Lonsberry
*Assistant Examiner* — Harrison Heflin
(74) *Attorney, Agent, or Firm* — Taft, Stettinius & Hollister LLP

(57) ABSTRACT

A vehicle system, apparatus, and/or method is provided. The vehicle system includes a powertrain including a prime mover and a transmission, and an electronic control system in operative communication with the powertrain including an adaptive cruise control (ACC) controller. The electronic control system is configured to determine a speed profile for a vehicle-in-front of the vehicle system while operating the vehicle system along a route. In response to the speed profile for the vehicle-in-front, the electronic control system is further configured to modify one or more output parameters of the powertrain to control one or more of a vehicle speed, a vehicle acceleration, and a vehicle deceleration of the vehicle system to inhibit control of the one or more output parameters by the ACC controller.

19 Claims, 6 Drawing Sheets

(56) References Cited

U.S. PATENT DOCUMENTS

| | | | |
|---|---|---|---|
| 2019/0061527 A1* | 2/2019 | Hassani | B60K 31/0008 |
| 2019/0100191 A1* | 4/2019 | Kikkawa | G07C 5/0808 |
| 2019/0184996 A1* | 6/2019 | Follen | B60W 10/04 |
| 2021/0213948 A1* | 7/2021 | Lahti | B60W 30/162 |
| 2023/0278558 A1* | 9/2023 | Deljosevic | B60W 50/0098 701/96 |

\* cited by examiner

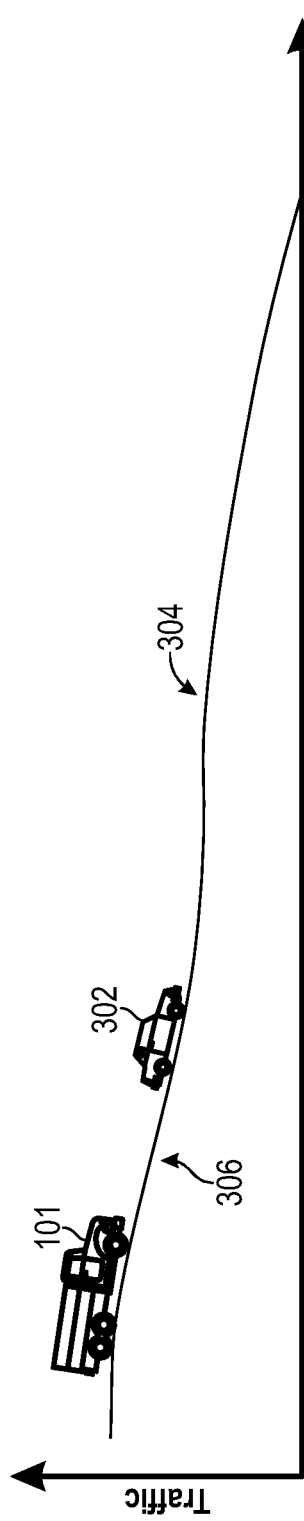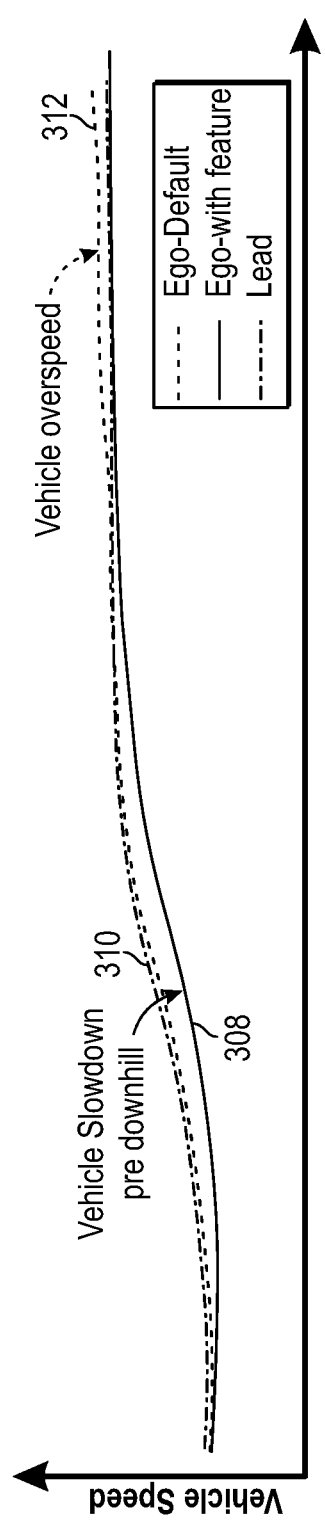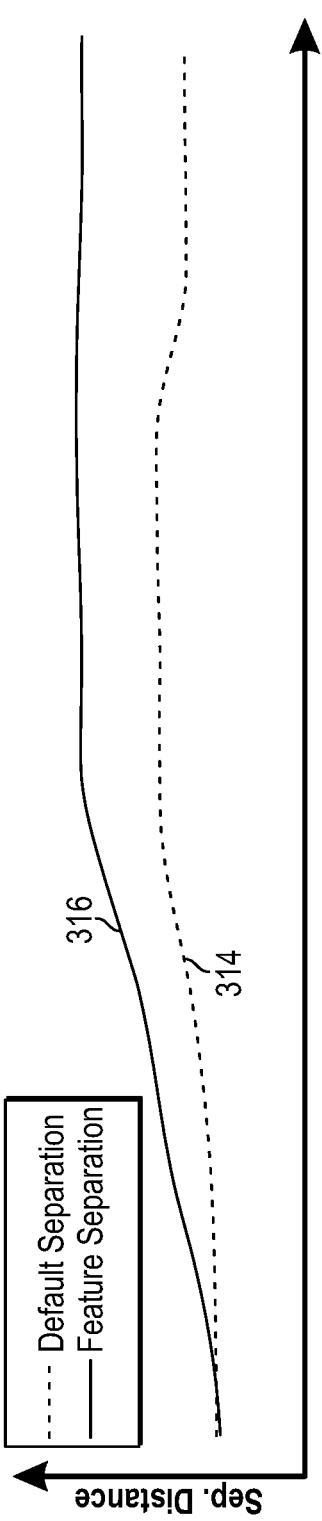

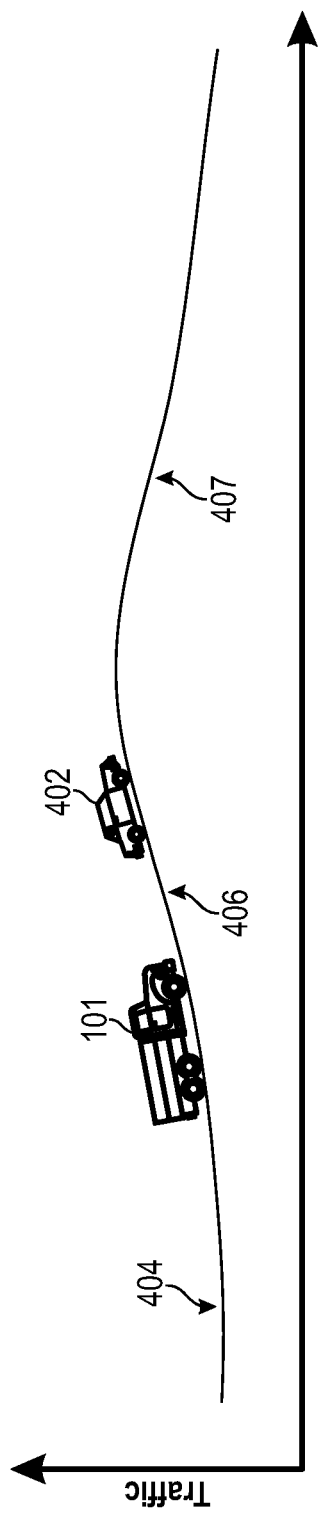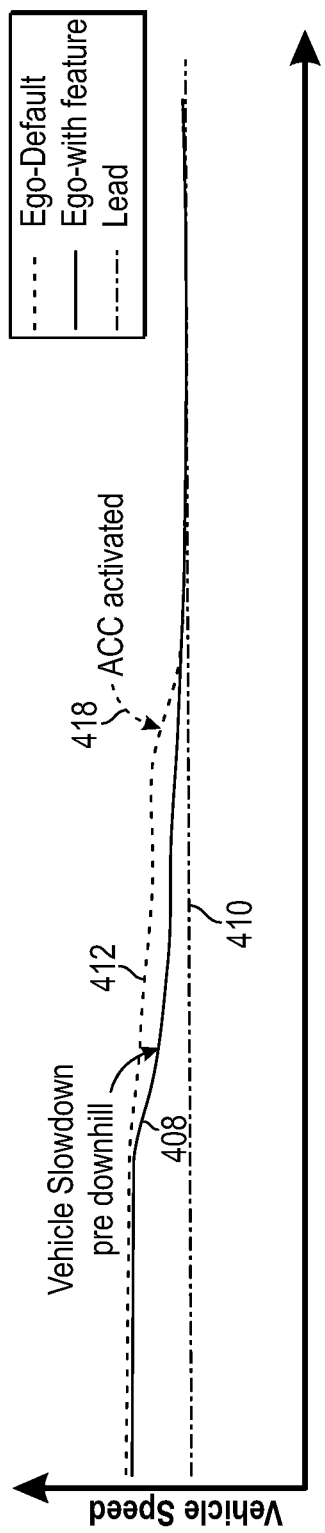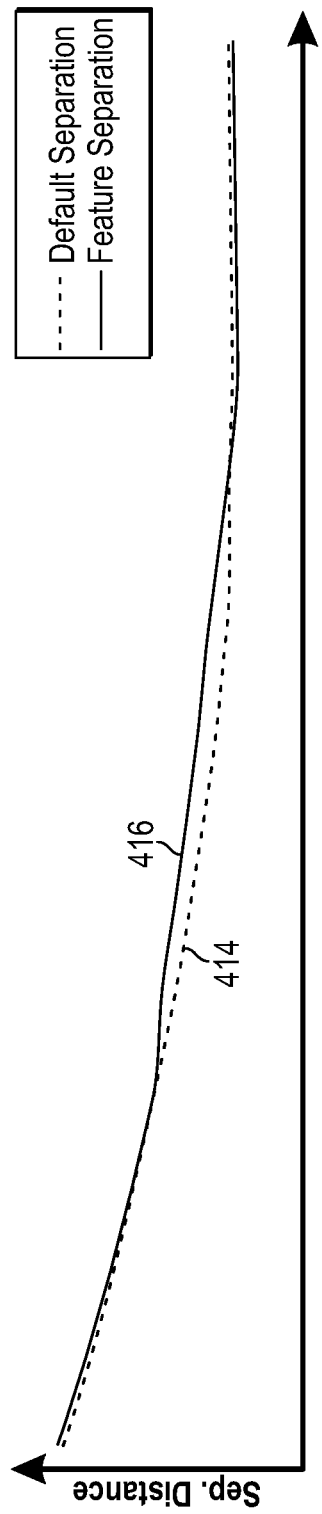

DYNAMIC POWERTRAIN CONTROL IN COORDINATION WITH ADAPTIVE CRUISE CONTROL

GOVERNMENT RIGHTS

This invention was made with government support under DE-EE0007761 awarded by the DOE. The Government has certain rights in this invention.

FIELD OF THE INVENTION

The present disclosure relates to systems, methods, and apparatuses for vehicle speed control and, more particularly, to operation of vehicle systems integrating dynamic powertrain control features with adaptive cruise control.

BACKGROUND

Many vehicles come equipped with adaptive cruise control systems to maintain a safe distance with a vehicle-in-front and avoid vehicle collisions while the vehicle speed is controlled via cruise control. When combined with predictive powertrain control features utilizing look-ahead information to control vehicle speed, the adaptive cruise control systems can inhibit benefits obtained from utilizing the predictive powertrain control features, such as improved fuel economy.

For example, in certain situations the predictive powertrain control features may seek to increase vehicle speed, but the presence of a vehicle-in-front results in the adaptive cruise control system actively controlling the vehicle speed. This may be viewed negatively from a drivability perspective as vehicle speed is increased and then the brakes are applied, sometimes abruptly.

There is a tradeoff in maintaining a close distance to a vehicle-in-front. While there is a fuel economy benefit due to drafting, this fuel economy benefit may be offset by energy dissipation if there is frequent braking activity by engine brake or service brakes.

Therefore, there remains a significant need for the apparatuses, methods, and systems disclosed herein.

DISCLOSURE OF ILLUSTRATIVE EMBODIMENTS

For the purposes of promoting an understanding of the principles of the invention disclosed, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein as would normally occur to one skilled in the art to which the invention relates, having the benefit of the present disclosure, are contemplated herein.

SUMMARY

Certain embodiments include unique vehicle systems, methods, and/or apparatuses including operation of dynamic powertrain control systems with predictive or look ahead control features and collision mitigation systems utilizing adaptive cruise control such that vehicle speed control by the adaptive cruise control system is reduced or inhibited. Further embodiments, forms, objects, features, advantages, aspects, and benefits shall become apparent from the following description and drawings.

BRIEF DESCRIPTION OF THE DRAWINGS

FIGS. 3A-3C are graphs illustrating an example of an electronic control system to modify acceleration of a vehicle due to a vehicle-in-front to inhibit adaptive cruise control.

FIGS. 4A-4C are graphs illustrating an example of an electronic control system to modify speed of a vehicle while decelerating with a vehicle-in-front to inhibit adaptive cruise control.

DESCRIPTION OF ILLUSTRATIVE EMBODIMENTS

Figure 1:
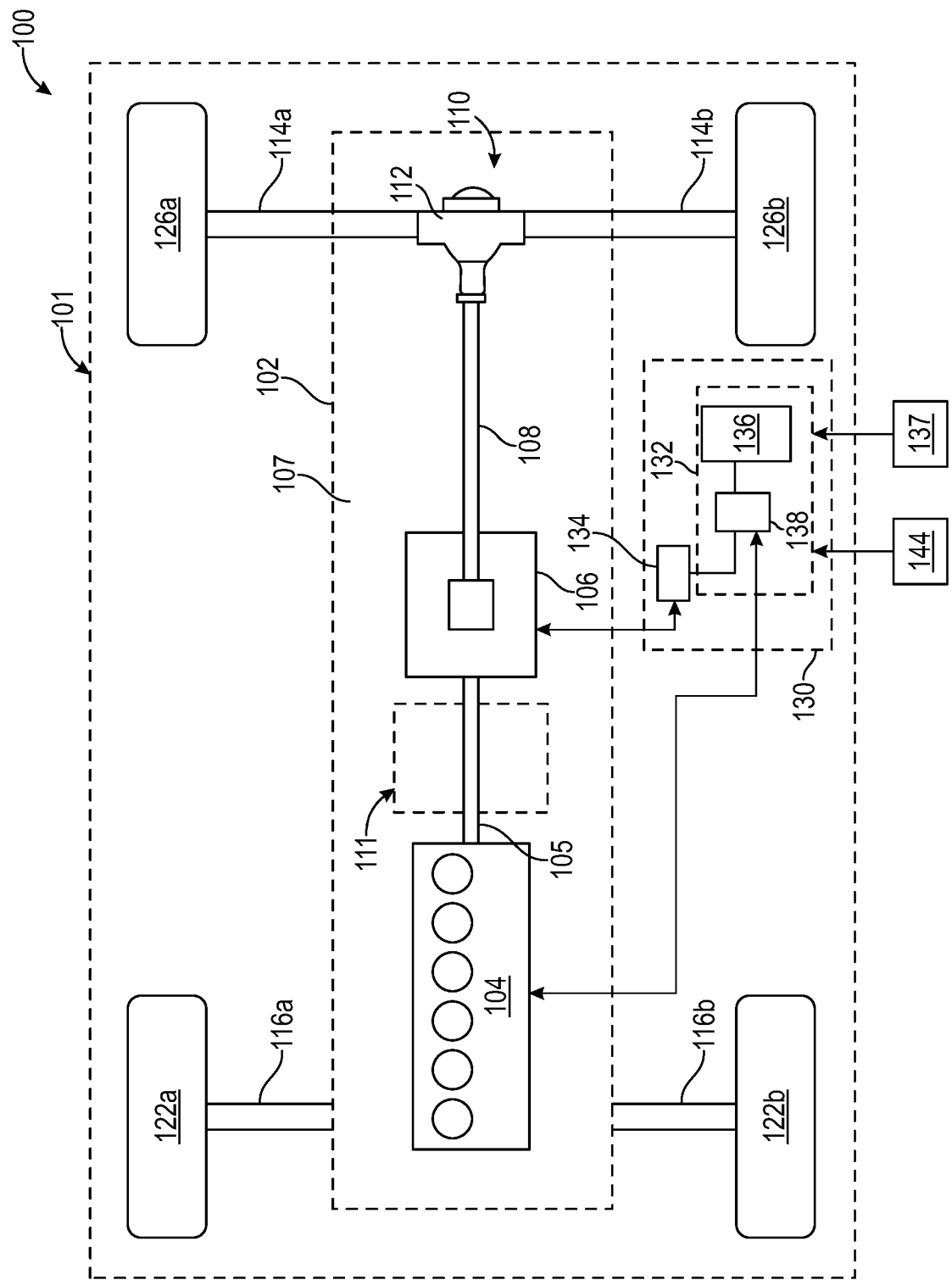
FIG. 1 is a schematic illustration of a vehicle system having a dynamic power controller integrated with an adaptive cruise controller to control speed a vehicle.

With reference to FIG. 1, there is illustrated a schematic view of an exemplary vehicle system 100 including a powertrain 102 incorporated within a vehicle 101. In the illustrated embodiment, the powertrain 102 includes a prime mover 104, such as an internal combustion engine, electric motor, and/or fuel cell structured to generate power for the vehicle 100. In certain embodiments vehicle 100 may include an electric machine and batteries of appropriate capacity to provide a hybrid electric powertrain in conjunction with an internal combustion engine. The powertrain 102 further includes a transmission 106 connected to the prime mover 104 for adapting the output torque of the prime mover 104 and transmitting the output torque to a driveline 107 including a drive shaft 108.

The transmission 106 may be disengageably connected to crankshaft 105 via a clutch (not shown.) In other embodiments, the transmission 106 may be disengageably connected to crankshaft 105 and the engagement and disengagement may be by operation of a master clutch provided at the front of the transmission, by operation of the transmission to place a gear in a neutral condition, or by other clutch and/or gearing arrangements. Various embodiments contemplate that transmission 106 may be an automatic transmission, an automated manual transmission, or any other suitable transmission with a disconnect device 111 that is operable to selectively engage and disengage prime mover 104 from driveline 107.

In the rear wheel drive configuration illustrated for vehicle system 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle system 100 having a front wheel drive configuration, transmission 106 may be a transaxle and final drive 110 may reside at the front of the vehicle 100, connecting front axles 116a and 116b to the prime mover 104 via the transaxle. It is also contemplated that in some embodiments the vehicle system 100 is in an all-wheel drive configuration.

In the illustrated embodiment, vehicle system 100 includes two front wheels 122a, 122b mounted to front axles 116a, 116b, respectively. Vehicle system 100 further includes two rear wheels 126a, 126b mounted to rear axles 114a, 114b, respectively. It is contemplated that vehicle system 100 may have more or fewer wheels than illustrated in FIG. 1. Vehicle system 100 may also include various components not shown, such as a fuel system including a fuel tank, a front differential, a braking system, a suspension, an engine intake system and an exhaust system, which may include an exhaust aftertreatment system, just to name a few examples.

Vehicle system 100 includes an electronic control system (ECS) 130 mounted all or in part on vehicle 101. The electronic control system 130 is directed to regulating and controlling the operation of prime mover 104 and transmission 106 among other components of vehicle 101. Electronic control system 130 includes a prime mover control unit (ECU) 132, sometimes referred to as an electronic or engine control module (ECM), or the like. Electronic control system 130 may also include a transmission control unit (TCU) 134, which is directed to the regulation and control of transmission 106 operation. The ECU 132 and TCU 134 are each in operative communication with a plurality of vehicle sensors (not shown) in vehicle system 100 for receiving and transmitting one or more operating conditions of vehicle 101. It is contemplated that ECU 132 and TCU 134 may be integrated within the prime mover 104 and transmission 106, respectively.

In the illustrated embodiment of the electronic control system 130, ECU 132 includes a look ahead controller 136 configured to receive look ahead data 137 including, but not limited to, road grade, speed limits, traffic information, traffic signals, weather, and/or any e-horizon type data that lets ECU 132 know what is happening on the route ahead and allows ECS 130 to react to that information without driver involvement by modifying one or more output parameters of powertrain 102.

In an embodiment, the look ahead controller 136 receives all or a part of look ahead data 137 from an intelligent transportation system (ITS) or similar system. An ITS generally refers to the integration of information and communication technologies with transport infrastructure to improve economic performance, safety, mobility and environmental sustainability. The ITS may include real-time traffic information systems that collect data on traffic conditions, aggregate and translate the data, and disseminate the traffic data through various technologies.

In some example embodiments, the ECU 132 includes an arbitrator 138 configured to arbitrate between two or more control commands for the output parameters of powertrain 102. For example, two or more control commands can provide different output parameters for the control of powertrain 102 in response to information received from look-ahead controller 136 and one or more other controllers, such as an adaptive cruise control (ACC) controller 144.

Figure 2:
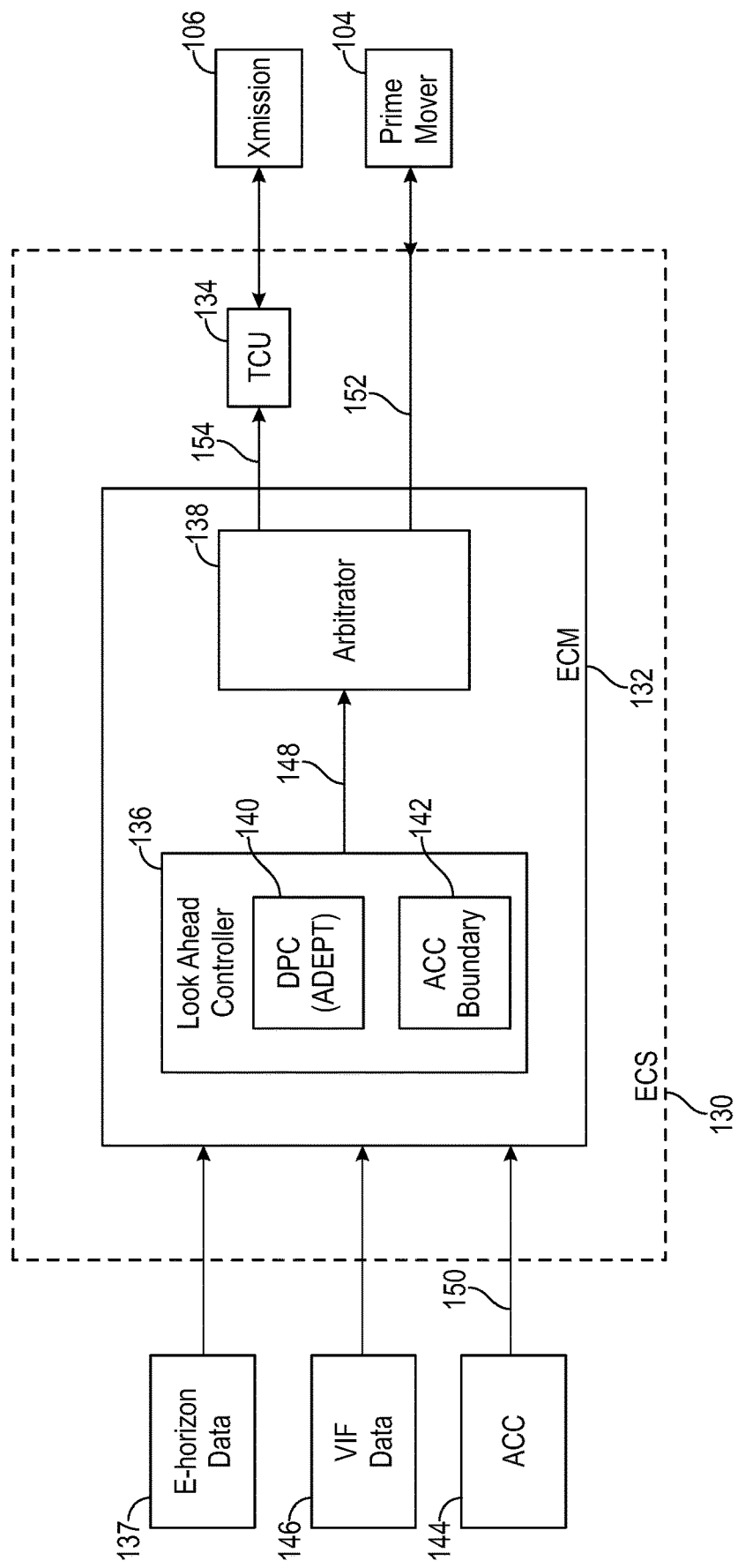
FIG. 2 is a schematic illustration of an electronic control system of the vehicle system in FIG. 1.

With reference to FIG. 2, there is a schematic view further illustrating certain aspects of the electronic control system 130. In the illustrated embodiment, look ahead controller 136 includes a dynamic powertrain (DP) controller 140 and an adaptive cruise control boundary (ACC boundary) controller 142. The ACC boundary controller 142 is configured to determine a speed profile for a vehicle-in-front (VIF) of vehicle 101 along the route in order to define a system boundary at which control of powertrain 102 by the ACC controller 144 will become active, and provide the VIF speed profile to DP controller 140 in order to proactively limit or inhibit control of one or more output parameters of powertrain 102 by ACC controller 144, as described in further detail below.

The DP controller 140 may receive inputs from one or more of the plurality of vehicle sensors in vehicle system 100. Utilizing look ahead data 137 and information obtained from the plurality of sensors, the DP controller 140 is configured to dynamically determine one or more output parameters 148 for powertrain 102 to improve fuel economy along a route in response to look ahead data 137. The look ahead controller 136, using the speed profile for the VIF from ACC boundary controller 142, can modify the output parameters from DP controller 140 to inhibit control of the one or more output parameters 148 by ACC controller 144 so that vehicle operation is maintained in a region that is controlled by ECU 132 rather than ACC controller 144.

The one or more output parameters 148 for powertrain 102 determined by look ahead controller 136 include, but are not limited to, a cruise speed of vehicle 101 and/or vehicle system 100, a gear state of transmission 106, an on/off state of prime mover 104, and an engaged/disengaged state between prime mover 104 and transmission 106. Electronic control system 130 can control the one or more output parameters 148 of powertrain 102 independently of ACC controller 144 in response to look ahead data 137 and the speed profile of the VIF from ACC boundary controller 142 to control one or more of a vehicle speed, a vehicle acceleration, and a vehicle deceleration of vehicle 101 and/or vehicle system 100.

For example, in an embodiment, the one or more output parameters 148 can be selected to reduce or increase the speed of vehicle 101 as a function of a separation distance and a speed of the vehicle-in-front. The output parameters 148 are selected to inhibit control by ACC controller 144 by maintaining the speed and separation of vehicle 101 with the vehicle-in-front such that the system boundary for adaptive cruise control of powertrain 102 is not reached by vehicle 101. The output parameters 148 can be based on, for example, the current operating conditions of vehicle 101 and for the vehicle-in-front.

In another embodiment, the one or more output parameters 148 can be selected to reduce or increase the speed of vehicle 101 as a function of a prediction of the separation distance and speed of the vehicle-in-front using look ahead data 137 and an on-line model of the vehicle-in-front. The model can be used to predict timing and locations for speed changes of the vehicle-in-front so that the one or more output parameters 148 can be adjusted before the ACC system boundary is reached by vehicle 101.

In another embodiment, the one or more output parameters 148 can be selected to reduce or increase the speed of vehicle 101 as a function of an estimated speed or slowing of the vehicle-in-front using look ahead data 137 about traffic, grade, and a learned model of the vehicle-in-front behavior. The learned model can be used to attempt to predict behavior of the vehicle-in-front so that the one or more output parameters 148 can be adjusted before the ACC system boundary is reached by vehicle 101.

The one or more output parameters 148 for vehicle 101 can be achieved using one or more predictive powertrain control features to achieve the desired vehicle speed, vehicle acceleration, or vehicle deceleration. Examples of predictive powertrain control features include, for example, predictive cruise control, predictive gear shifting, predictive neutral coasting, predictive prime mover off coasting such as engine off coasting, and/or predictive prime mover braking such as engine braking. Electronic control system 130 can automatically employ one or more of these predictive powertrain control features to regulate operation of powertrain 102 in response to the one or more output parameters 148 in order to inhibit active control of the powertrain 102 by ACC controller 144.

The ECU 132, TCU 134, and look ahead controller 136, including DP controller 140 and ACC boundary controller 142, are exemplary components of an integrated circuit-based electronic control system 130 which may be configured to control various operational aspects of vehicle system 100 and powertrain 102 as described in further detail herein. An electronic control system 130 according to the present disclosure may be implemented in a number of forms and may include a number of different elements and configurations of elements. In certain preferred forms an electronic control system 130 may incorporate one or more microprocessor-based or microcontroller-based electronic control units sometimes referred to as electronic control modules.

An electronic control system 130 according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an electronic control system 130 and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

The electronic control system 130 and/or any of the components 132, 134, 136, 140, 142 thereof includes stored data values, constants, and functions, as well as operating instructions stored on, for example, a computer readable medium. Any of the operations of exemplary procedures described herein may be performed at least partially by the electronic control system 130. In certain embodiments, the electronic control system 130 includes one or more controllers structured to functionally execute the operations of the controller. Further details of certain exemplary embodiments of controller operations are discussed below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

In an example embodiment, ECM 132 is configured to receive information from an adaptive cruise control (ACC) controller 144. The ACC controller 144 is configured to determine a torque command or limit 150 that automatically adjusts the vehicle speed profile of vehicle 101 in response to one or more separation parameters between vehicle 101 and the vehicle-in-front while the vehicle 101 is in a cruise control mode of operation. For example, the ACC controller 144 may determine a torque command or limit 150 that automatically adjusts the speed of vehicle 101 to maintain a safe distance from one or more other vehicle-in-front in response to, for example, a speed of the vehicle 101 and the speed of the vehicle-in-front and/or a separation distance between vehicle 101 and the vehicle-in-front.

ECM 132, ACC controller 144, and/or the look ahead controller 136 may also be configured to receive vehicle-in-front (VIF) data 146 from a vehicle-in-front of vehicle 101. The VIF data 146 may include a separation distance and a speed profile for the vehicle-in-front. The speed profile for the vehicle-in-front may include a current speed and a predicted speed of the vehicle-in-front. The predicted speed of the vehicle-in-front may be determined from look ahead data 137 associated with the route.

In an embodiment, ACC boundary controller 142 is configured to generate a model of the vehicle-in-front including the speed profile of the vehicle-in-front. The model of the vehicle-in-front may be based on one or more operating parameters of the vehicle-in-front including, but not limited to, vehicle mass, rolling resistance, aerodynamic drag, wind force, a power capability of a prime mover of the vehicle-in-front, and wind direction. The operating parameters associated with the model of the vehicle-in-front may be determined by an estimation of the operating parameters based on the vehicle speed of the vehicle-in-front, sharing of the operating parameters from the vehicle-in-front over vehicle-to-vehicle (V2V) communications, and/or dynamic sharing of a velocity prediction from the vehicle-in-front over V2V communications.

Arbitrator 138 receives the one or more output parameters 148 from look ahead controller 136 and the torque command or limit 150 from ACC controller 144. Arbitrator 138 preferentially selects the one or more output parameters 148 upon which to base the control of powertrain 102. However, if one or more separation parameters with the vehicle-in-front are or will be violated, the torque command or limit 150 is selected by arbitrator 138 for control of the output of powertrain 102, over-riding look ahead controller 136.

Depending on the result from arbitrator 138, a final torque or fuel command 152 is provided to prime mover 104 and a final gear or neutral state command 154 is provided to TCU 134 for control of transmission 106. In cases where one or more separation parameters are or will be violated, commands 152, 154 are determined by ACC controller 144. Otherwise, the commands 152, 154 are determined in response to the one or more output parameters 148 that are based on look ahead data 137 and the speed profile of the vehicle-in-front that inhibits control by the ACC controller 144.

FIGS. 3A-5C illustrate various example operations of electronic control system 130 under specified route conditions. It should be understood that other route conditions and operations of electronic control system 130 are also contemplated and are not precluded by way of the specific examples discussed herein.

With reference to FIGS. 3A-3C, there is an exemplary illustration of electronic control system 130 configured to modify an acceleration of vehicle 101 to inhibit activation of the ACC controller 144 to command powertrain 102 to bring vehicle 101 back up to speed to maintain the separation distance with the vehicle-in-front. In FIG. 3A, vehicle 101 is shown traveling behind vehicle-in-front 302 along route 304 having a grade profile including decline 306. In FIG. 3B, VIF speed profile 310 shows the speed of vehicle-in-front 302, while the ACC speed profile 312 shows the speed of vehicle 101 if ACC controller 144 controlled the output of powertrain 102.

Using electronic control system 130 and look ahead controller 136, a modified speed profile 308 shows the speed of vehicle 101 being controlled with look ahead controller 136 rather than by the now inhibited ACC controller 144. As can be observed in FIG. 3B, the modified speed profile 308 allows a lower speed for vehicle 101 along a portion of route 304 for increased fuel economy. As shown in FIG. 3C, the separation distance 316 between vehicles 101, 302 increases using output parameters 148 determined by look ahead controller 136 as compared to the minimum separation distance 314 between vehicles 101, 302 that is maintained by ACC controller 144. The command from ACC controller 144 can be used as a limit to maintain the desired separation parameters between vehicles 101, 302.

With reference to FIGS. 4A-4C, there is an exemplary illustration of electronic control system 130 configured to modify the speed of vehicle 101 while decelerating. In FIG. 4A, vehicle 101 is shown traveling behind vehicle-in-front 402 along route 404 which includes a grade profile including an incline 406 and a subsequent decline 407. In FIG. 4B, VIF speed profile 410 shows the speed of vehicle-in-front 402, while the ACC speed profile 412 shows the speed of vehicle 101 if ACC controller 144 controlled the output of powertrain 102.

Using electronic control system 130, a modified speed profile 408 shows the speed of vehicle 101 being controlled with look ahead controller 136 rather than by the now inhibited ACC controller 144. As can be observed in FIG. 4B, the modified speed profile 408 allows a lower speed for vehicle 101 along the incline 406 portion of route 404 for increased fuel economy. Once the decline 407 is reached, look ahead controller 136 allows the speed of vehicle 101 to increase and more closely follow vehicle-in-front 402 until a separation parameter is violated at point 418. The ACC controller 144 is then no longer inhibited and actively controls the output of powertrain 102 along the remaining portion of decline 407 to maintain a minimum separation distance between the vehicles.

As shown in FIG. 4C, the separation distance 416 between vehicles 101, 402 increases along incline 406 using output parameters 148 determined by look ahead controller 136 as compared to the ACC controller 144. The minimum separation distance 414 of ACC controller 144 is maintained after point 418, but control of powertrain 102 by ACC controller 144 is inhibited prior to point 418 so that the separation distance 416 is allowed to increase as compared to separation distance 414.

Figure 5A:
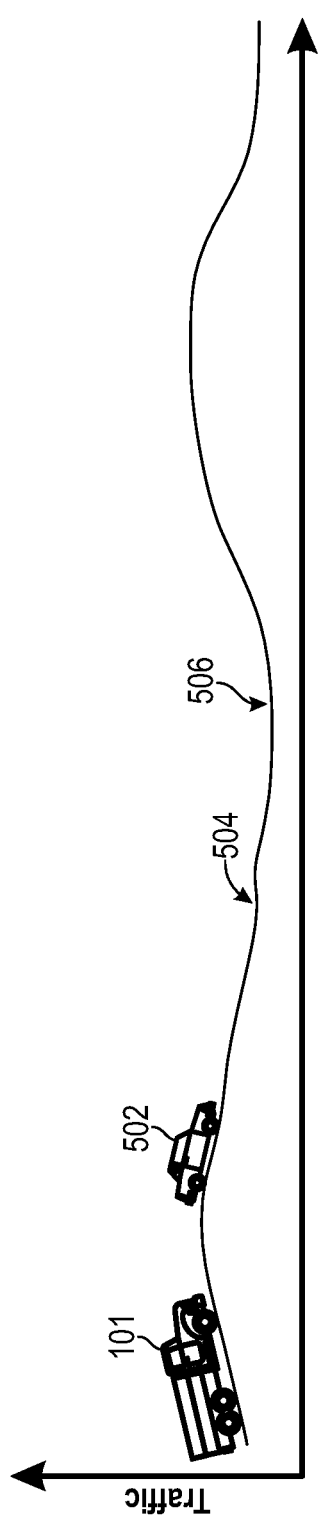
FIGS. 5A-5C are graphs illustrating an example of an electronic control system to modify speed of a vehicle at all times based on a vehicle-in-front to inhibit adaptive cruise control.
Figure 5B:
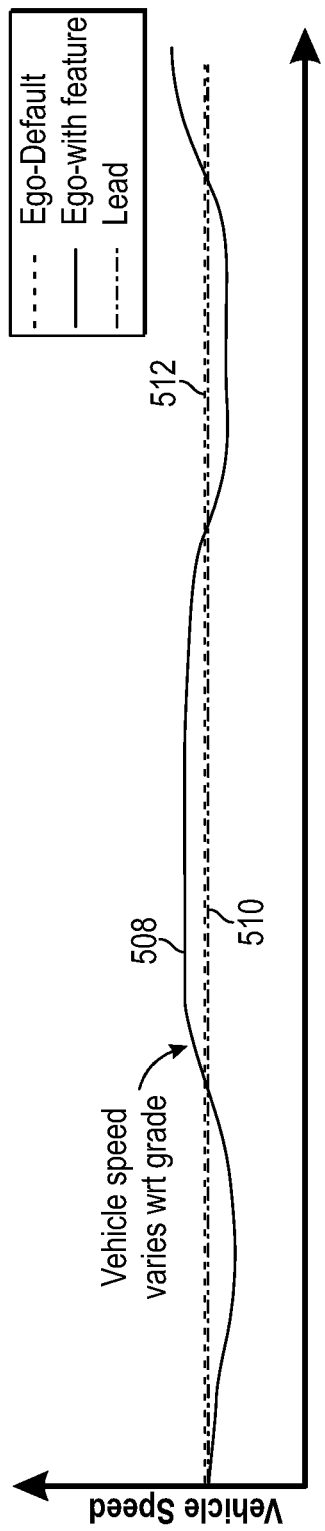
Figure 5C:
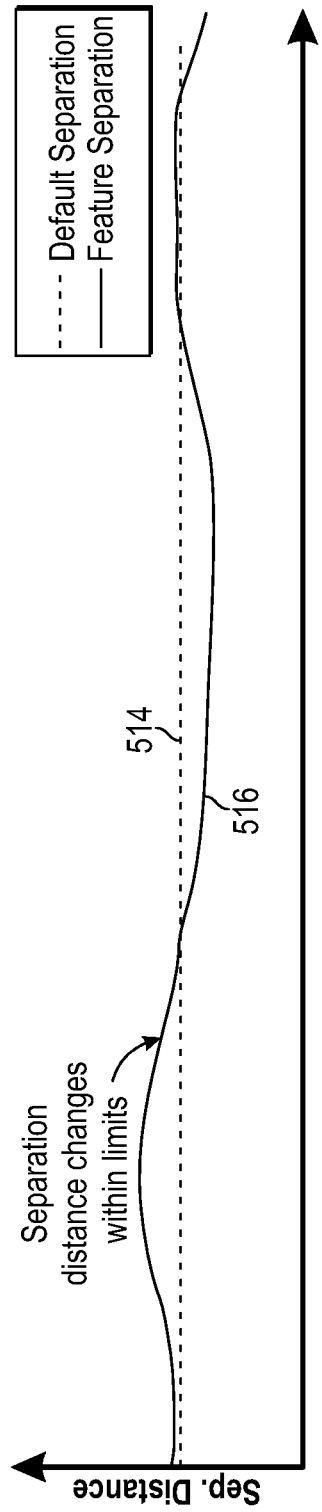

With reference to FIGS. 5A-5C, there is an exemplary illustration of electronic control system 130 configured to modify the speed of vehicle 101 at all times based on vehicle-in-front 502. In FIG. 5A, vehicle 101 is shown traveling behind vehicle-in-front 502 along route 504 having an undulating grade profile 506 with multiple inclines and declines. In FIG. 5B, VIF speed profile 510 shows the speed of vehicle-in-front 502, while the ACC speed profile 512 shows the speed of vehicle 101 if ACC controller 144 controlled the output of powertrain 102. As can be observed, the vehicle 101 maintains the same speed as vehicle-in-front 502 under speed profile 512.

Using electronic control system 130, a modified speed profile 508 shows the speed of vehicle 101 being controlled with look ahead controller 136 rather than by the now inhibited ACC controller 144. As can be observed in FIG. 5B, depending on the grade, the modified speed profile 508 allows a lower speed for vehicle 101 as compared to vehicle-in-front 502 along certain portions of route 504, and a greater speed than vehicle-in-front 502 along other portions of route 504. If a separation parameter is violated, the ACC controller 144 is then no longer inhibited and actively controls the output of powertrain 102 along the route 504 to maintain a minimum separation distance.

As shown in FIG. 5C, the separation distance 516 between vehicles 101, 502 also varies along route 504, in contrast to the relatively constant separation distance 514 provided by ACC controller 144. The separation distance 516 can be allowed to change between maximum and minimum limits with control by ACC controller 144 only being activated to maintain minimum separation.

Figure 6:
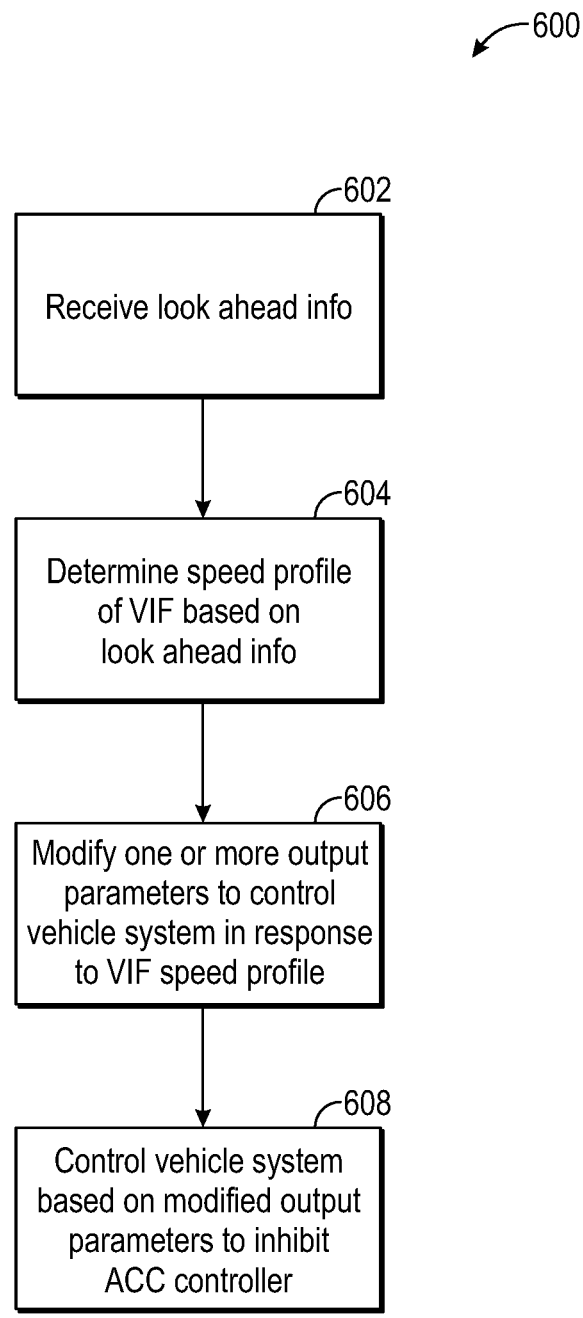
FIG. 6 is a flow diagram of an example procedure for controlling a vehicle system.

With reference to FIG. 6, there is illustrated a flow diagram of an example procedure for controlling a vehicle 101 to inhibit control of one or more output parameters by ACC controller 144. Procedure 600 includes an operation 602 to receive look-ahead information associated with the route traveled by vehicle 101. The look-ahead information can include, for example, look ahead data 137, VIF data 146, and/or data from ACC controller 144.

Procedure 600 includes an operation 604 to determine a speed profile of a vehicle-in-front based on the look-ahead information from operation 602. The speed profile can include one or more of a current speed of the vehicle-in-front and a predicted speed of the vehicle-in-front. In an embodiment, the predicted speed of the vehicle-in-front is determined based on a model of the vehicle-in-front and look-ahead data associated with the route. In an embodiment, the model of the vehicle-in-front is based on one or more operating parameters of the vehicle-in-front, the one or more operating parameters being determined by at least one of: an estimation of the operating parameters based on the vehicle speed of the vehicle-in-front; sharing of the operating parameters from the vehicle-in-front over vehicle-to-vehicle communications; and dynamic sharing of a velocity prediction from the vehicle-in-front over vehicle-to-vehicle communications.

Procedure 600 includes an operation 606 to modify one or more output parameters to control powertrain 102 of the vehicle system 100 in response to the speed profile of the vehicle-in-front. The modified output parameters inhibit control of the powertrain 102 by ACC controller 144. The modified output parameters can control one or more of a vehicle speed, a vehicle acceleration, and a vehicle deceleration of the vehicle 101 to inhibit operative control by ACC controller 144. Procedure 600 includes an operation 608 to control the powertrain 102 of the vehicle 101 with look ahead controller 136 independently of ACC controller 144 based on the one or more modified output parameters.

A number of aspect of the present disclosure are contemplated. For example, a first aspect is a vehicle system including a powertrain including a prime mover and a transmission. The powertrain is configured to provide power from the prime mover to the transmission to drive one or more ground contacting wheels and propel the vehicle system along a route. The vehicle system includes an electronic control system in operative communication with the powertrain, and an ACC controller. The electronic control system is configured to determine a speed profile for a vehicle-in-front of the vehicle system while operating the vehicle system along the route. In response to the speed profile for the vehicle-in-front, the electronic control system is configured to modify one or more output parameters of the powertrain to control one or more of a vehicle speed, a vehicle acceleration, and a vehicle deceleration of the vehicle system to inhibit control of the one or more output parameters by the ACC controller.

In certain embodiments of the foregoing system, the electronic control system is configured to control the one or more output parameters of the powertrain with one or more predictive powertrain control features that achieve the one or more output parameters in response to look-ahead information along the route independently of the ACC controller. In further embodiments, the one or more predictive powertrain control features include one or more of predictive cruise control, predictive gear shifting, predictive neutral coasting, predictive prime mover off coasting, and predictive prime mover braking.

In certain embodiments, the one or more output parameters include one or more of a cruise speed of the vehicle system, a gear state of the transmission, an on/off state of the prime mover, and an engaged/disengaged state between the prime mover and the transmission.

In certain embodiments, the electronic control system includes a look ahead controller configured to control the one or more output parameters of the powertrain independently of the ACC controller in response to look-ahead data associated with the route and the speed profile for the vehicle-in-front. In certain embodiments, the ACC controller is configured to override the look ahead controller and modify the one or more output parameters in response to one or more separation parameters between the vehicle system and vehicle-in-front being less than a separation threshold.

In certain embodiments, the speed profile for the vehicle-in-front includes a current speed of the vehicle-in-front and a predicted speed of the vehicle-in-front. In certain embodiments, the predicted speed of the vehicle-in-front is determined by a model of the vehicle-in-front and look-ahead data associated with the route. In certain embodiments, the model of the vehicle-in-front is based on one or more operating parameters of the vehicle-in-front, the one or more operating parameters being determined by at least one of an estimation of the operating parameters based on the vehicle speed of the vehicle-in-front, sharing of the operating parameters from the vehicle-in-front over vehicle-to-vehicle communications, and dynamic sharing of a velocity prediction from the vehicle-in-front over vehicle-to-vehicle communications.

In certain embodiments, the operating parameters for the vehicle-in-front include one or more of a vehicle mass, a rolling resistance, an aerodynamic drag, a wind force, a power capability of a prime mover of the vehicle-in-front, and a wind direction. In embodiments, the electronic control system includes a DP controller and an ACC boundary controller, and the electronic control system is configured to modify output parameters determined by the DP controller in response to look ahead route information for at least part of a route traveled by the vehicle system based on the speed profile for the vehicle-in-front determined by the ACC boundary controller, and limit the one or more output parameters in response to a command from the ACC controller in response to a separation parameter between the vehicle-in-front and the vehicle system being violated.

A second of the present disclosure is a method that includes operating a vehicle with a powertrain including a prime mover and a transmission. The powertrain is configured to provide power from the prime mover to the transmission to drive one or more ground contacting wheels and propel the vehicle along a route. The method includes determining a speed profile for a vehicle-in-front of the vehicle while operating the vehicle along the route. The method also includes, in response to the speed profile for the vehicle-in-front, modifying one or more output parameters of the powertrain to control one or more of a vehicle speed, a vehicle acceleration, and a vehicle deceleration of the vehicle to inhibit control of the one or more output parameters by an ACC controller.

In certain embodiments of the foregoing method, the method includes automatically controlling one or more output parameters of the powertrain independently of the ACC controller in response to look-ahead information along the route before modifying one or more output parameters of the powertrain. In certain embodiments, automatically controlling the one or more output parameters includes achieving the one or more output parameters using one or more of predictive cruise control, predictive gear shifting, predictive neutral coasting, predictive prime mover off coasting, and predictive prime mover braking.

In certain embodiments of the method, modifying the one or more output parameters includes modifying one or more of a cruise speed of the vehicle, a gear state of the transmission, an on/off state of the prime mover, and an engaged/disengaged state between the prime mover and the transmission.

In certain embodiments of the method, the one or more output parameters are modified independently of the ACC controller in response to look-ahead data associated with the route and the speed profile of the vehicle-in-front by a look ahead controller. In certain embodiments, the method further includes limiting one or more output parameters with the ACC controller in response to one or more separation parameters between the vehicle and vehicle-in-front being less than a separation threshold.

In certain embodiments, determining the speed profile for the vehicle-in-front includes determining a current speed of the vehicle-in-front and determining a predicted speed of the vehicle-in-front. In certain embodiments, the method further includes determining the predicted speed of the vehicle-in-front based on a model of the vehicle-in-front and look-ahead data associated with the route. In certain embodiments, the model of the vehicle-in-front is based on one or more operating parameters of the vehicle-in-front, and the one or more operating parameters are determined by at least one of an estimation of the operating parameters based on the vehicle speed of the vehicle-in-front, sharing of the operating parameters from the vehicle-in-front over vehicle-to-vehicle communications, and dynamic sharing of a velocity prediction from the vehicle-in-front over vehicle-to-vehicle communications.

As will be understood by one skilled in the art having the benefit of the present disclosure, the terms used to identify the components of the systems and methods disclosed herein may be similarly described by other terms unless explicitly provided to the contrary. While various embodiments of an engine and transmission control system and methods for using the same have been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected. A variety of further embodiments according to the present disclosure are contemplated. Those skilled in the art will appreciate that many modifications are possible in the example embodiments without materially departing from this disclosure. Accordingly, all such modifications are intended to be included within the scope of this disclosure as defined in the following claims.

What is claimed is:

1. A vehicle system, comprising:
a powertrain including a prime mover and a transmission, the powertrain being configured to provide power from the prime mover to the transmission to drive one or more ground contacting wheels and propel the vehicle system along a route;
an electronic control system including a prime mover control unit in operative communication with the powertrain and an adaptive cruise control (ACC) controller in communication with the electronic control system, the electronic control system being configured to:
determine a speed profile for a vehicle-in-front of the vehicle system while operating the vehicle system along the route;
receive an ACC boundary that defines a system boundary at which the ACC controller will actively control one or more output parameters of the powertrain in response to look-ahead data associated with the route and the speed profile for the vehicle-in-front; and
in response to the look-ahead data associated with the route and the speed profile for the vehicle-in-front, modify the one or more output parameters of the powertrain to control one or more of a vehicle speed, a vehicle acceleration, and a vehicle deceleration of the vehicle system to proactively inhibit control of the one or more output parameters of the powertrain by the ACC controller so that operation of the powertrain remains under control of the prime mover control unit.

2. The vehicle system of claim 1, wherein the electronic control system is configured to control the one or more output parameters of the powertrain with one or more predictive powertrain control features that achieve the one or more output parameters in response to look-ahead information along the route independently of the ACC controller.

3. The vehicle system of claim 2, wherein the one or more predictive powertrain control features include one or more of predictive cruise control, predictive gear shifting, predictive neutral coasting, predictive prime mover off coasting, and predictive prime mover braking.

4. The vehicle system of claim 1, wherein the one or more output parameters include one or more of a cruise speed of the vehicle system, a gear state of the transmission, an on/off state of the prime mover, and an engaged/disengaged state between the prime mover and the transmission.

5. The vehicle system of claim 1, wherein the electronic control system includes a look ahead controller configured to control the one or more output parameters of the powertrain independently of the ACC controller in response to the look-ahead data associated with the route and the speed profile for the vehicle-in-front.

6. The vehicle system of claim 1, wherein the speed profile for the vehicle-in-front includes a current speed of the vehicle-in-front and a predicted speed of the vehicle-in-front.

7. The vehicle system of claim 6, wherein the predicted speed of the vehicle-in-front is determined by a model of the vehicle-in-front and look-ahead data associated with the route.

8. The vehicle system of claim 7, wherein the model of the vehicle-in-front is based on one or more operating parameters of the vehicle-in-front, the one or more operating parameters being determined by at least one of: an estimation of the operating parameters based on the vehicle speed of the vehicle-in-front; sharing of the operating parameters from the vehicle-in-front over vehicle-to-vehicle communications; and dynamic sharing of a velocity prediction from the vehicle-in-front over vehicle-to-vehicle communications.

9. The vehicle system of claim 8, wherein the operating parameters for the vehicle-in-front include one or more of a vehicle mass, a rolling resistance, an aerodynamic drag, a wind force, a power capability of a prime mover of the vehicle-in-front, and a wind direction.

10. The vehicle system of claim 1, wherein the electronic control system includes a dynamic powertrain (DP) controller and an ACC boundary controller, and the electronic control system is configured to:
modify output parameters determined by the DP controller in response to look ahead route information for at least part of a route traveled by the vehicle system based on the speed profile for the vehicle-in-front determined by the ACC boundary controller; and
limit the one or more output parameters in response to a command from the ACC controller in response to a separation parameter between the vehicle-in-front and the vehicle system being violated.

11. A method comprising:
operating a vehicle with a powertrain including a prime mover and a transmission, the powertrain being configured to provide power from the prime mover to the transmission under control of a prime mover control unit to drive one or more ground contacting wheels and propel the vehicle along a route;
determining a speed profile for a vehicle-in-front of the vehicle while operating the vehicle along the route;
receiving an adaptive cruise control (ACC) boundary that defines a boundary at which one or more output parameters of the powertrain are actively controlled by an ACC controller in response to look-ahead data associated with the route and the speed profile for the vehicle-in-front; and
in response to the look-ahead data associated with the route and the speed profile for the vehicle-in-front, modifying the one or more output parameters of the powertrain to control one or more of a vehicle speed, a vehicle acceleration, and a vehicle deceleration of the vehicle to proactively inhibit control of the one or more output parameters of the powertrain by the ACC controller so that operation of the powertrain remains under control of the prime mover control unit.

12. The method of claim 11, further comprising automatically controlling one or more output parameters of the powertrain independently of the ACC controller in response to look-ahead information along the route before modifying one or more output parameters of the powertrain.

13. The method of claim 12, wherein automatically controlling the one or more output parameters includes achieving the one or more output parameters using one or more of predictive cruise control, predictive gear shifting, predictive neutral coasting, predictive prime mover off coasting, and predictive prime mover braking.

14. The method of claim 11, wherein modifying the one or more output parameters includes modifying one or more of a cruise speed of the vehicle, a gear state of the transmission, an on/off state of the prime mover, and an engaged/disengaged state between the prime mover and the transmission.

15. The method of claim 11, wherein the one or more output parameters are modified independently of the ACC controller in response to the look-ahead data associated with the route and the speed profile of the vehicle-in-front by a look ahead controller.

16. The method of claim 15, further comprising limiting one or more output parameters with the ACC controller in response to one or more separation parameters between the vehicle and vehicle-in-front being less than a separation threshold.

17. The method of claim 11, wherein determining the speed profile for the vehicle-in-front includes determining a current speed of the vehicle-in-front and determining a predicted speed of the vehicle-in-front.

18. The method of claim 17, further comprising determining the predicted speed of the vehicle-in-front based on a model of the vehicle-in-front and look-ahead data associated with the route.

19. The method of claim 18, wherein the model of the vehicle-in-front is based on one or more operating parameters of the vehicle-in-front, the one or more operating parameters being determined by at least one of: an estimation of the operating parameters based on the vehicle speed of the vehicle-in-front; sharing of the operating parameters from the vehicle-in-front over vehicle-to-vehicle communications; and dynamic sharing of a velocity prediction from the vehicle-in-front over vehicle-to-vehicle communications.

\* \* \* \* \*